(12) United States Patent
King et al.

(10) Patent No.: US 6,766,075 B1
(45) Date of Patent: Jul. 20, 2004

(54) SIDE PUMPING OF OPTICAL FIBER SYSTEMS VIA MULTIPLE DELIVERY FIBERS

(75) Inventors: George G. King, Storrs, CT (US); Peter K. Cheo, Waterford, CT (US)

(73) Assignee: PC Photonics Corporation, Waterford, CT (US)

( * ) Notice: Subject to any disclaimer, the term of this patent is extended or adjusted under 35 U.S.C. 154(b) by 229 days.

(21) Appl. No.: 10/076,193

(22) Filed: Feb. 13, 2002

Related U.S. Application Data

(60) Provisional application No. 60/290,283, filed on May 11, 2001.

(51) Int. Cl.[7] ................................................. G02B 6/26
(52) U.S. Cl. ......................... 385/31; 385/126; 385/127; 385/128; 372/6
(58) Field of Search .............................. 385/31, 32, 49, 385/88, 123, 42, 43, 4, 126–128; 372/6

(56) References Cited

U.S. PATENT DOCUMENTS

| | | | | |
|---|---|---|---|---|
| 4,815,079 A | * | 3/1989 | Snitzer et al. | 372/6 |
| 5,170,458 A | * | 12/1992 | Aoyagi et al. | 385/127 |
| 5,491,581 A | * | 2/1996 | Roba | 359/341.3 |
| 5,530,709 A | * | 6/1996 | Waarts et al. | 372/6 |
| 5,854,865 A | * | 12/1998 | Goldberg | 385/31 |
| 5,999,673 A | * | 12/1999 | Valentin et al. | 385/43 |
| 6,101,199 A | * | 8/2000 | Wang et al. | 372/6 |

OTHER PUBLICATIONS

U.S. patent application Ser. No. 60/290,283.*

* cited by examiner

*Primary Examiner*—Phan T. H. Palmer
*Assistant Examiner*—Jennifer Doan
(74) *Attorney, Agent, or Firm*—M. P. Williams

(57) ABSTRACT

Efficient delivery of large amounts of pump laser power distributed along the cladding (11, 54) of a single core (6) or multiple core (7, 51) laser fiber, without degrading the fiber integrity or compromising the fiber's waveguiding property, is accomplished by injecting the power into the cladding via delivery fibers (18, 30, 42, 62) permanently affixed to a peripheral wall (20, 56) at an angle that satisfies the condition for total internal reflection of the pump radiation so that it is confined within the inner cladding of the laser fiber. In one embodiment, the laser fiber (51) is wrapped around a drum (53). Each delivery fiber has a numerical aperture (NA) less than half the NA of the laser fiber, and a core 21 having a refractive index substantially the same as that of the inner cladding (11) of the laser fiber.

15 Claims, 2 Drawing Sheets

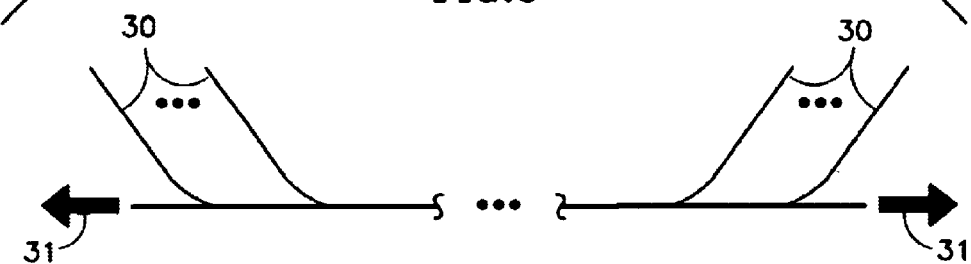
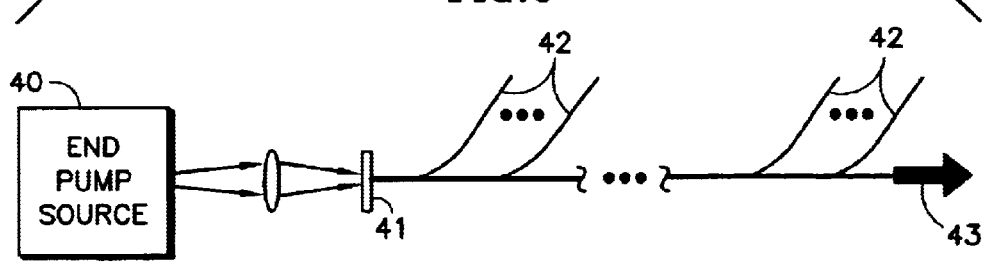
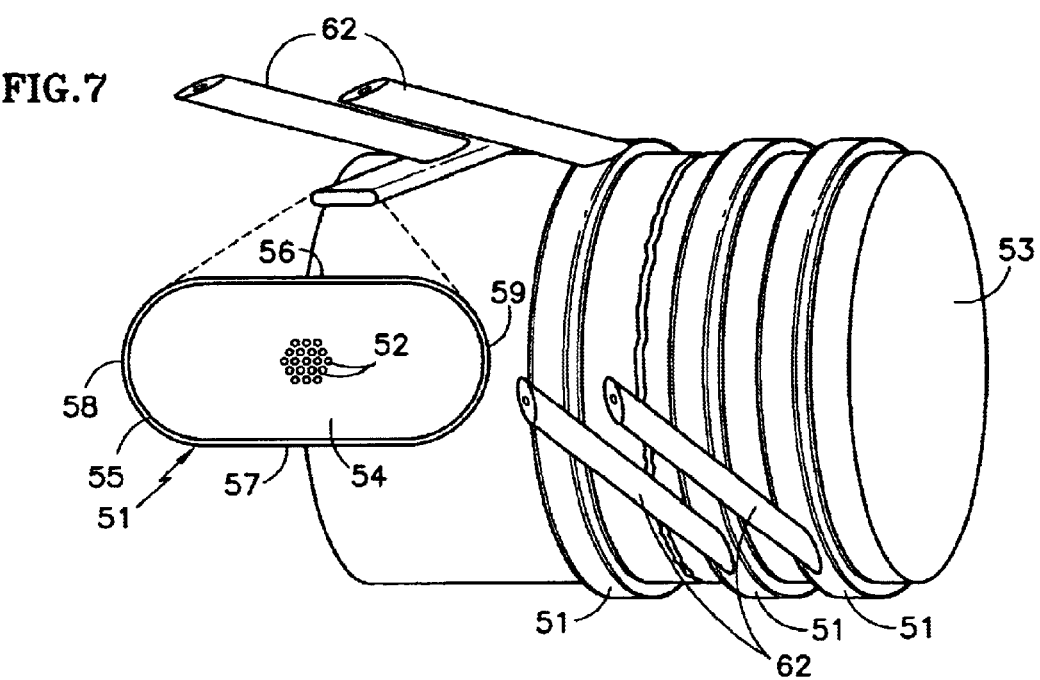

SIDE PUMPING OF OPTICAL FIBER SYSTEMS VIA MULTIPLE DELIVERY FIBERS

The benefit of U.S. provisional patent application, Serial No. 60/290,283, filed May 11, 2001, is claimed.

TECHNICAL FIELD

This invention relates to side pumping a dual clad fiber laser through delivery fibers disposed along the length of the laser fiber, the delivery fibers having a numerical aperture of not more than half the numerical aperture of the laser fiber, having a core with a refractive index equal to the refractive index of the inner cladding (the multimode core) of the laser fiber.

BACKGOUND ART

High power fiber lasers, including fiber laser amplifiers, are most effectively pumped by semiconductor laser diodes. It is commonplace in the art to use diode laser pumps which are pigtailed, i.e., coupled into a multimode fiber, for ease of power delivery. In a multi-core, laser fiber, the diode pump's power, at a preselected wavelength, is absorbed by a dopant, or combination of dopants, in a single-mode core of the laser fiber, which emit at a different wavelength, dependent on the dopant. The typical beam shape of an edge emitting semiconductor laser is elliptical and is best matched to the cross section of a rectangular shaped inner cladding. Heretofore, although there are patents and papers describing various schemes to feed the pump light through the side of the laser fiber, all practical systems thus far pump the laser through the end of the laser fiber.

End pumping has its drawbacks. There exist only two ports. The size of the end facets impose a severe limitation on the amount of pump power that can be injected into the fiber laser, which often suffers damage when the pump power exceeds 60W. It has been shown in R. Waarts, "Fiber Laser Technology for Commercial and DoD Applications", Thirteenth Annual Solid-State and Diode Transfer Laser Technology Review, 2000, that the power damage threshold for cladding materials is approximately $1.9 \times 10^9 \text{W/m}^2$ by assuming a 60W of pump power launched into a cladding with a diameter of 100 $\mu$m. Finally, the absorption of pump power, and therefore the gain of the end pumped system, along the length of fiber, is very non-uniform; thus the system suffers a significant loss in efficiency.

In U.S. Pat. No. 5,864,644, fused tapered couplers are used to combine power, by placing the fibers together, twisting and pulling when heat is applied. However, the dimensions of the fibers are altered and the waveguiding properties of the fibers are consequently changed. Nonetheless, the method allows the power in the fused area to combine and be coupled into the fiber end facet. However, the power must be launched within the numerical aperture of the receiving fiber; power residing outside of this cone will be lost.

U.S. Pat. No. 5,127,068 discloses the use of a cylindrical micro-lens for collimating the output of a diode laser bar so that the pump radiation can be coupled into a double clad fiber laser. Such an arrangement requires a precisely aligned narrow spacing between the lens and the fiber facet. This requirement creates difficulty in making a proper alignment without causing physical damage to the optical components.

Much effort has been made to develop high power fiber lasers by clad pumping, but such effort has only reached limited success.

In a clad pumped laser system, the diode pump power is introduced into an inner cladding region, where it propagates due to internal reflection along its length. While pump power is propagating within the inner cladding region, it undergoes multiple reflections and repetitively passes through a doped core, where it is absorbed.

Side pumping has the ability for use of multiple ports, which has two major advantages: (1) while the pump power density at each port can be maintained well below the material damage thresholds, the sum over multiple inputs can provide extremely large amounts of pump power for the system, and (2) the pump power being distributed along the length of the fiber flattens the spatial gain in the system, thereby increasing the efficiency of the system per unit length. Side pumping can be accomplished by evanescent means or by direct coupling.

One method for side pumping of a clad pumped fiber laser system by evanescent means, disclosed in U.S. Pat. No. 5,999,673, uses fused tapered coupler techniques in which the delivery fiber is heated and pulled at its output end, thereby creating a tapered portion. Tapering the delivery fiber inherently causes a significant loss of pump power, which leaks out of the fiber. The tapered portion of the fiber is placed in contact with the double clad system by twisting the two fibers together, and then heated and pulled, thus causing that portion of the double clad system to be deformed; such deformation on a multicore system may destroy the phase locking of the system.

Another side pumping method, disclosed in U.S. Pat. No. 5,854,865, employs a deep V-groove cut into the inner cladding of a double clad fiber laser. By focusing the diode laser beam onto the V-groove with a lens, the pump light can be coupled into the inner cladding with a coupling efficiency greater than 80%. However, fabrication of V-grooves using an abrasive process to remove a significant amount of material (nearly half) can lead to structural damage to the clad pumped system where localized stresses become a major issue and increase the chance of fiber breakage. Also, V-grooves compromise the waveguiding capabilities of the system; therefore, if multiple V-grooves are used they must be placed far apart, thereby limiting the number of available ports.

Other means of side pumping by direct injection are disclosed in: E. F. Stephens, D. L. Wise, "A Ruggedized Fiber Laser for Force Protection Capabilities", Thirteenth Annual Solid State and Diode Laser Technology Review, 2000, T. Weber, W. Luthy, H. P. Weber, "Side-Pumped Fiber Laser", Applied Physics B, Vol. 63, pp. 131–134, 1996, and I. K. Ilev, R. W. Waynan, "Grazing-lncidence-Based Hollow Taper for infrared Laser-to-Fiber Coupling", Applied Physics Letters, Vol. 74, pp. 2921–2923, 1999. These either use various external micro optics, such as prisms, lenses and tapering components, or inject the pump power into a closed system with a highly reflecting inner wall. These efforts have not provided a satisfactory solution due to low coupling efficiencies or difficulties in maintaining perfect optical alignments.

U.S. Pat. No. 4,815,079 discloses a clad pumped laser system in which the diode pump power is introduced through side-coupled delivery fibers. However, the laser fiber has a rectangular inner cladding (outer core), and the delivery fibers also have a similar, rectangular core. By making certain assumptions, it is claimed that coupling efficiencies as high as 89% are achievable;

however, in the practical world, that configuration cannot yield efficiencies much over 30%. Further, the rectangular-cored delivery fibers are not well suited to easy interconnection with commercially available diode lasers and their pigtails or connectors.

The various clad pumping schemes for fiber double clad laser fibers known to the prior art are not effective in producing very high power without incorporating additional, necessary features. Very high power cannot be obtained from fiber lasers by end pumping alone, because the high pump power can lead to power damage at the two end facets of the fiber. Side pumping of a fiber laser has heretofore been very inefficient.

DISCLOSURE OF INVENTION

Objects of the present invention include: provision of high power fiber lasers; provision of an efficient and robust clad-pumped laser; efficient coupling of pump power from a delivery fiber by directly injecting the power into a laser fiber, through the sidewall, without twisting, tapering or cutting grooves in the fiber; delivering pump power to a laser fiber in a manner satisfying total internal reflection, without using external micro optics, such as lenses and prisms, at the interface; delivering pump power to an optical fiber without the need for subsequent adjustment; providing a more uniform gain profile in fiber lasers including fiber laser amplifiers; allowing large amounts of pump power to be injected into a fiber laser system; injecting high power into a clad pumped laser with very low insertion loss; and clad pumping of a laser using standard size fibers for delivery fibers, whose dimensions are well matched with the commercially available pigtailed diode pumps, so that the connection and disconnection of the two can be made easily by fusion splicing or with standard connectors.

This invention is predicated in part on the recognition that the refractive index of the delivery core should match that of the receiving laser inner cladding to avoid reflection at the interface, and in part on the recognition that the delivery fiber of a side-pumped laser system should have a core with a numerical aperture which is less than half of the numerical aperture of the inner cladding of the laser fiber to ensure total reflection of the delivered light within the laser fiber.

According to the present invention, laser pump power is injected into a clad pumped fiber laser system through at least one delivery fiber which is contiguous with the sidewall of the system, forming an integrated unit, the numerical aperture of the core of the delivery fiber being less than half the numerical aperture of the inner cladding of the laser fiber. According to the present invention, laser pump power is injected into a clad pumped fiber laser system through at least one delivery fiber which is permanently bonded to the sidewall of the system, forming an integrated unit, the index of refraction of the core of the delivery fiber being substantially the same as the index of refraction of the inner cladding of the laser fiber. According further to the present invention, laser pump power is distributed, in one or two directions, along the length of the clad pumped fiber laser system through multiple integrated ports.

In accord with another aspect of the present invention, the pump power is injected into the laser fiber at an angle such that it passes from the delivery fiber to the receiving fiber and is confined within the system by meeting the requirements for total internal reflection with Snell's Law. With the invention, it is possible to transfer nearly all of the pump power to the core of a double clad fiber laser system of the invention.

A feature of the invention is that by permanently affixing the delivery fiber to the fiber laser, a robust and extremely low maintenance connection is created. Furthermore, this interface does not degrade the fiber structure, has negligible effects upon the waveguiding properties of the inner cladding region, and does not alter the physical dimensions of the cores. Therefore, it will not degrade the phase locking in a multicore fiber laser array. By balancing the indexes of refraction at both interfaces, (i.e., the interface of the core of the power delivery fiber with the inner cladding of the power receiving fiber) with the angle of introduction of the pump power, an efficient power transfer from fiber-to-fiber is accomplished while still meeting the total internal reflection requirement of the receiving fiber.

The invention offers three major advantages: (1) no further adjustment is needed, thus the maintenance cost is reduced; (2) attaching a delivery fiber which closely matches a pigtailed laser diode pump using a commercial fusion splicer reduces the insertion loss significantly (to less than 0.1 dB); and (3) the integrity of the clad pumped fiber system is preserved, despite the bonding of many delivery fibers at any location along the peripheral wall of the system, as desired. Since the cladding has very low insertion loss, the pump power injected according to the invention can travel over a very long fiber length while transferring the power to the doped core(s) to stimulate the ions for laser oscillation or amplification. Although the pump density at each port is below the damage threshold, the sum over all ports can be extremely high, leading to high power output that can exceed multiple kilowatts. Furthermore, extremely large amounts of pump power can be distributed among multiple ports along the length of a single fiber, thereby engendering a uniform gain.

The more uniform the gain in a fiber laser, the better the slope of efficiency. Therefore, the multiple ports of the invention enable the system to operate at efficiencies that can approach the quantum limit: 95% efficiency has been achieved. This highly efficient side pumping technique enables double clad fiber lasers to far surpass power damage limitations inherent in end pumping techniques.

The invention provides a robust method of transferring a large amount of pump power into fiber lasers through the sidewall of the inner cladding of a laser fiber, without degrading the structural integrity or the wave guiding properties of the fiber. The invention may be applied to other systems, such as fiber optical amplifiers and switches. By distributing the pump power through multiple ports along the fiber, this invention provides a significant increase in the total amount of transferred pump power, as compared to end pumping methods. Furthermore, the multiple ports generate a uniform gain that raises the system efficiency. The apparatus is extremely robust because the delivery fibers and the clad pumped system are integrated as a single unit, thus eliminating the use of various external optics, such as lenses and prisms, and avoiding the need for continuous optical alignment and tedious adjustments. The method provides a convenient way to connect/disconnect the pump source with a minimum insertion loss, <0.1 dB.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 5 is a schematic illustration of an embodiment of the invention.

FIG. 6 is a schematic illustration of another embodiment of the invention.

FIG. 7 is a perspective view of a side-pumped laser employing multiple delivery fibers of the present invention, wrapped around a drum.

MODE(S) FOR CARRYING OUT THE INVENTION

Figure 1:
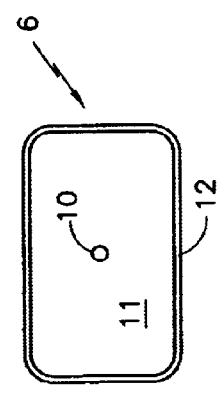
FIG. 1 is a cross sectional view, with cross hatching omitted for clarity, of a known single core, double clad optical fiber with generally rectangular inner cladding, known to the prior art.
Figure 2:
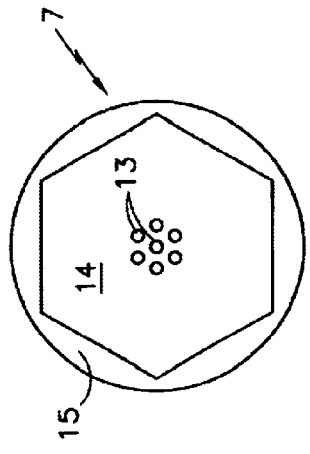
FIG. 2 is a cross sectional view, with cross hatching omitted for clarity, of a multiple core, double clad fiber with a hexagonal inner cladding, known to the prior art.

In FIGS. 1 and 2, exemplary laser fibers 6, 7 known to the prior art are shown. Referring to FIG. 1, a double clad laser fiber 6 has a single core 10, a generally rectangular inner cladding 11, and an outer cladding 12. In FIG. 2, a double clad laser fiber 7 has a plurality of cores 13, and inner cladding 14 with a hexangular cross section and an outer cladding 15.

Figure 3:
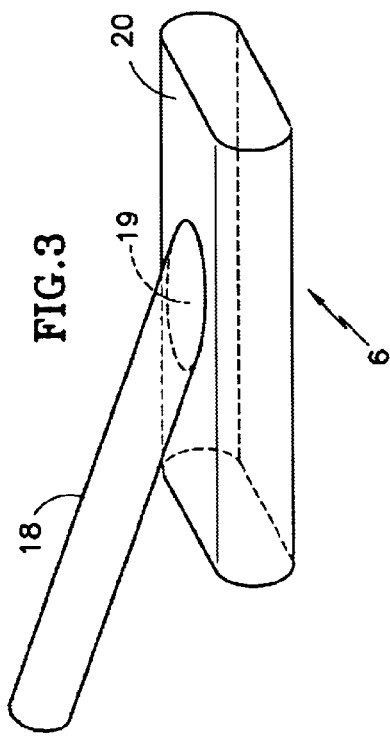
FIG. 3 is a perspective view of a ribbon laser fiber with two curved edges having a pump power delivery fiber attached thereto, in accordance with the invention.
Figure 4:
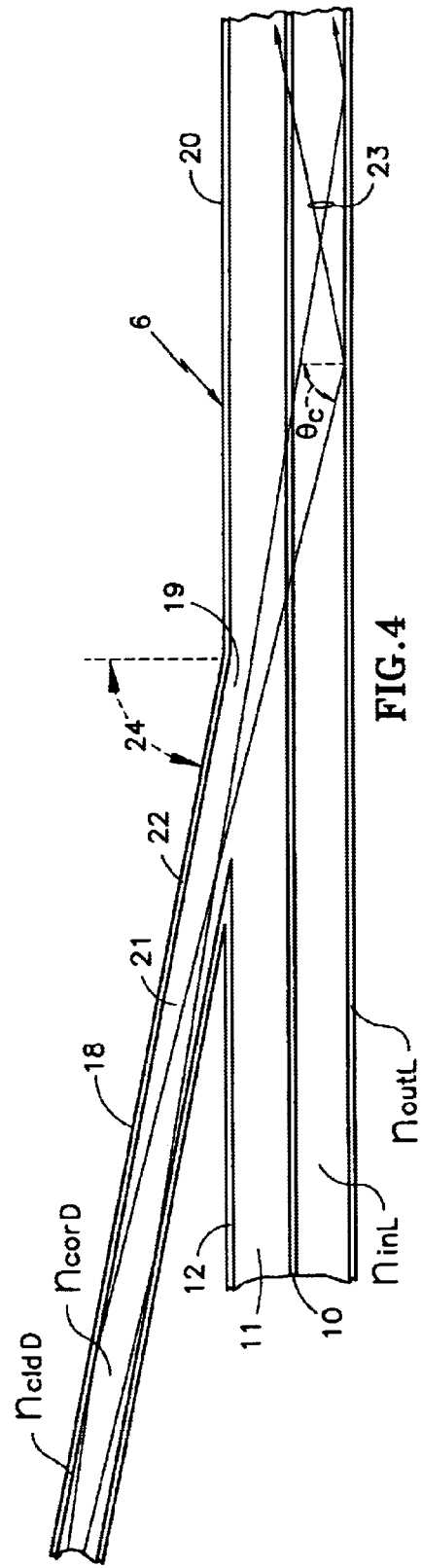
FIG. 4 is a simplified, sectional view of the laser fiber with attached delivery fiber of FIG. 3, with cross hatching and the outer cladding and its interface all omitted for clarity.

In FIGS. 3 and 4, a delivery fiber 18 is joined to a laser fiber 6 at an interface 19 with a flattened peripheral wall 20. The delivery fiber 18 has a core 21 and an outer cladding 22; the light is maintained within the core 21 by reflection until it passes directly into the inner cladding 11 of the laser fiber 6. Pump power of an appropriate wavelength (which is deemed herein to include a narrow band of wavelengths) is injected into the inner cladding 11 at a properly chosen angle of introduction 24, and is guided within the inner cladding, as shown by arrows 23, over a long length of fiber, passing through the core 10, until its power is absorbed by the rare earth dopant gain medium in the core, which excites the rare earth dopants, creating optical gain, thereby producing laser emission. The emission from the gain medium is guided by the core. The angle 24 at which light is introduced into the fiber laser 6 from the delivery fiber 18 can be determined by applying Snell's law. Similarly, at the interface of the inner and outer cladding, the critical (minimum) angle to maintain total internal reflection, $\theta_c$, can be determined, given the indexes of refraction for each. The cladding configurations have a numerical aperture (NA) in the range of 0.23 to 0.5 and the delivery fiber has an NA significantly smaller than the laser fiber, generally in the range of 0.12 to 0.22, but in all events, less than half of the NA of the inner cladding of the laser fiber. The critical angle, $\theta_c$, of a double clad laser fiber is comparatively large, typically with a value of about 75°. Light introduced into the inner cladding from a delivery fiber with a polished face and mounted at an angle 24 between 70° and 85° can be efficiently coupled into the system, depending on the indices of refraction of the delivery fiber and the inner cladding. By carefully choosing the indices of refraction and the angle of introduction 24, pump power can be coupled into the inner cladding after passing through the delivery fiber-laser fiber interface 19 while still meeting the requirements for total internal reflection within the inner cladding.

For no reflection, the refractive index of the core of the delivery fiber, $n_{corD}$, must be substantially equal to the index of refraction of the inner cladding of the laser fiber, $n_{inL}$.

For total internal reflection within the laser fiber inner cladding, the numerical aperture (NA) of the delivery fiber must be half, or less, of the NA of the inner cladding of the laser fiber. The NA of the delivery fiber is the square root of the difference between the square of $n_{corD}$ and the square of the index of the cladding of the delivery fiber $n_{corD}$. Similarly, the NA of the laser fiber is the square root of the difference between the square of $n_{inL}$ and the index of the outer cladding of the laser fiber, $n_{outL}$. Therefore:

$$n_{corD} \approx n_{inL} \text{ and}$$

$$(n_{coD}^2 - n_{clD}^2)_{1/2} \leq (n_{inL}^2 - n_{outL}^2)^{1/2} \leq (n_{inL}^2 - n_{outL}^{22})^{1/2}/2$$

As an example, if the inner cladding of a double clad system has an index of refraction of 1.46 and a numerical aperture of 0.47, and the delivery fiber has the same refractive index but a smaller numerical aperture of 0.22, almost the entire optical power (>99%) can be transferred from the delivery fiber to the laser fiber at a critical angle of 79°. But if the index of the delivery fiber core is larger than that of the inner cladding of the laser fiber, both the optical transfer efficiency and the critical angle will decrease: for an example, if the index of the delivery fiber core is 1.5, the maximum optical power transfer efficiency is 74% at a critical angle of 71°.

A jig is used to secure the delivery fiber 18, or a bundle of delivery fibers, for polishing the end face of the delivery fibers (or bundle) at the predetermined angle 24 of introduction. The polished end face (tip) has an optically smooth face at the predetermined angle and is aligned crosswise with the inner cladding wall of the laser fiber, where the two surfaces are bonded together using a very thin layer of optical grade adhesive (such as epoxy), preferably with an index of refraction matched to that of the inner cladding 11. Since bonding the delivery fiber to the sidewall of the inner cladding neither alters the structural integrity nor reduces the mechanical strength of the laser fiber, and has only negligible effects on the waveguiding properties of the cladding, multiple ports may be used along the length of the laser fiber. The pump power may be delivered into the system by using either a single fiber or a bundle of fibers: as used herein, "delivery fiber" means either a single fiber or a bundle of fibers attached to a clad-pumped laser fiber for delivering pump power into the laser fiber. The determining factor for choosing different types and sizes of the delivery fiber, whether a single fiber or a bundle of fibers, is the cross sectional dimension of the wall of the laser fiber, which may be on the order of between 650 microns and over one millimeter, since the diameter of the delivery fiber, or the width of the bundle, which may be on the order of 645 microns for a bundle of nineteen fibers, cannot exceed the width of the wall of the laser fiber in order to maintain a good coupling.

Referring to FIG. 5, the pump power can be introduced into the system through one or many side ports through multiple delivery fibers 30. The locations of the delivery fibers can be chosen freely and can be placed in relatively close proximity, if desired, but distribution of the power improves the gain and efficiency.

Additionally, the pump power can be delivered to the fiber in both directions, as seen in FIG. 5. Pump power can be delivered in a direction away from the end of the fiber, as seen in FIG. 5, to avoid leakage of pump power exiting the clad pumped system prior to being absorbed, in lasers having a relatively short absorption length. The laser power 31 can be obtained from both ends of a strictly clad pumped fiber system.

In FIG. 6, the invention employs multiple delivery fibers 42 used in conjunction with an end pumping source 40 and a dichroic mirror 41 or coating, on one or both ends of the clad pumped system. In this case the laser power 43 can only be obtained from one end of the system. If a totally reflecting mirror or end coating is used to replace the diachronic mirror 41, the system can be operated by side pumping only.

Referring to FIG. 7, a double clad fiber 51, in the shape of a long ribbon with two curved edges and having multiple cores 52, is wrapped around a substrate structure, such as a drum 53, in a single layer. The drum 53 may be cooled by conduction and/or convection to remove excess heat; it may be hollow to promote cooling, if desired. The multicore fiber 51 shown is double clad, with the inner cladding layer 54 in a ribbon shape. This is achieved by polishing two sides of a round preform parallel, prior to addition of the outer cladding 55, to create two flat sides 56, 57, leaving two curved sides 58, 59. One flat side 57 is facing the drum 53 to enable a good heat transfer while the other flat side 56 is exposed to accept pump power via multiple delivery fibers 62 at any desired points along the entire length of the fiber, only a few of which are shown for clarity.

As used herein, "contiguous" means being in intimate contact, with no air between the core of the delivery fiber (or bundle) and the inner cladding of the pumped (laser) fiber, so that there is no matter with a significantly different index of refraction between the two, and thus no significant reflection. The joinder may be by bonding with optical grade adhesive, fusion, clamping with an index-matching fluid therebetween, or in any other suitable way.

Obviously, many possible variations can be made in the implementation of the delivery fiber invention presented herein.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A side-pumped, fiber laser system, comprising:

a double clad laser fiber having a numerical aperture and at least one flat surface, and having at least one core doped with at least one element which is photo-emissive in response to electromagnetic radiation of a particular wavelength; and a plurality of delivery fibers, each contiguous with the periphery of internal cladding of said laser fiber;

characterized by the improvement comprising:

each said delivery fiber delivering electromagnetic radiation into said laser fiber at an acute angle selected to provide substantially total internal reflection within said laser fiber of any electromagnetic radiation transmitted into said internal cladding;

each said delivery fiber having a numerical aperture which is one-half or less of the numerical aperture of said laser fiber; and the refractive index of the core of each said delivery fiber being substantially equal to the refractive index of said inner cladding of said laser fiber.

2. A system according to claim 1 wherein:

said delivery fibers are attached to said periphery by fusion.

3. A system according to claim 1 wherein:

said delivery fibers are attached to said periphery by bonding with epoxy resin.

4. A system according to claim 3 wherein:

said delivery fibers are attached to said periphery by means of an adhesive having an effective index of refraction substantially the same as said index of refraction of said core of each said delivery fiber.

5. A system according to claim 1 wherein:

said delivery fibers are attached to said periphery along substantially the entire length of said laser fiber.

6. A system according to claim 1 further comprising:

a substrate structure, said laser fiber being wrapped around said substrate structure.

7. A system according to claim 1 wherein said laser fiber has a single core.

8. A system according to claim 1 wherein said laser fiber has multiple cores.

9. A drum laser, comprising:

a cylindrical substrate structure;

a double clad laser fiber having internal cladding and having at least one core doped with at least one element which is photo-emissive in response to electromagnetic radiation of a particular wavelength, said laser fiber having first and second sides, at least said first side being flat, said laser fiber being wrapped around said substrate structure with said second side in contact with said structure; and a plurality of delivery fibers, each contiguous with said first side;

characterized by the improvement comprising:

each said delivery fiber attached to said first side at an acute angle selected to provide substantially total internal reflection within said laser fiber of any electromagnetic radiation transmitted into said internal cladding;

each said delivery fiber having a numerical aperture which is one-half or less of the numerical aperture of said laser fiber; and the refractive index of the core of each said delivery fiber being substantially equal to the refractive index of said inner cladding of said laser fiber.

10. A system according to claim 9 wherein:

said delivery fibers are attached to said first side by fusion.

11. A system according to claim 9 wherein:

said delivery fibers are attached to said first side by bonding with epoxy resin.

12. A system according to claim 9 wherein:

said delivery fibers are attached to said first side by means of an adhesive having an effective index of refraction substantially the same as the index of refraction of each said delivery fiber core.

13. A system according to claim 9 wherein:

said delivery fibers are attached to said first side along substantially the entire length of said laser fiber.

14. A system according to claim 9 wherein said laser fiber has a single core.

15. A system according to claim 9 wherein said laser fiber has multiple cores.

* * * * *